US012221205B2

(12) United States Patent
Lee

(10) Patent No.: US 12,221,205 B2
(45) Date of Patent: Feb. 11, 2025

(54) INSPECTION SYSTEM FOR INNER BORE INSPECTIONS

(71) Applicant: GOODRICH CORPORATION, Charlotte, NC (US)

(72) Inventor: Seokwon Lee, Hamilton (CA)

(73) Assignee: GOODRICH CORPORATION, Charlotte, NC (US)

( * ) Notice: Subject to any disclaimer, the term of this patent is extended or adjusted under 35 U.S.C. 154(b) by 193 days.

(21) Appl. No.: 17/741,128

(22) Filed: May 10, 2022

(65) Prior Publication Data

US 2023/0365253 A1 Nov. 16, 2023

(51) Int. Cl.
*B64C 25/28* (2006.01)
*B64D 45/00* (2006.01)

(52) U.S. Cl.
CPC .......... *B64C 25/28* (2013.01); *B64D 45/0005* (2013.01)

(58) Field of Classification Search
CPC ............ B64C 25/28; G01N 2021/9548; G01N 21/954
See application file for complete search history.

(56) References Cited

U.S. PATENT DOCUMENTS 6,683,641 B1 * 1/2004 MacCracken ........... F01D 5/005 348/82
7,038,444 B2 5/2006 Crouch et al.
8,035,374 B1 10/2011 Girrell et al.

FOREIGN PATENT DOCUMENTS

CN 113124262 * 7/2021
RU 2 661 552 7/2018

OTHER PUBLICATIONS

European Patent Office, European Partial Search Report dated Sep. 29, 2023 in Application No. 23169626.1.
European Patent Office, European Search Report dated Jan. 11, 2024 in Application No. 23169626.1.

* cited by examiner

*Primary Examiner* — Justin M Benedik
(74) *Attorney, Agent, or Firm* — SNELL & WILMER L.L.P.

(57) ABSTRACT

An inspection system is disclosed herein. The inspection system includes a control system and a hub assembly. The control system includes a base having a top surface and configured to move horizontally forward and backward, an upright member extending orthogonally from the top surface of the base and configured to move vertically up and down, the upright member having a top surface, and an elongated member extending orthogonal to the upright member having a proximal end and a distal end, the proximal end connected to the top of the upright member, wherein the elongated member is configured to rotate. The hub assembly is connected to the distal end of the elongated member. The hub assembly includes a spring-loaded arm extending orthogonally from the hub assembly and a sensor connected to a distal end of the spring-loaded arm.

17 Claims, 5 Drawing Sheets

A - A

INSPECTION SYSTEM FOR INNER BORE INSPECTIONS

FIELD

The present disclosure generally relates inspecting landing components and more specifically to inspecting the inner bore of landing gear cylinders.

BACKGROUND

Landing gear cylinders are manufactured and/or repaired by grinding of the inner bore area to meet roughness and dimension standards. Grinding the inner bore may induce thermal damage which will reduce the fatigue life of dynamically loaded cylinders and can lead to failures. Thermal damage may occur when the friction from grinding produces too much heat and affects microstructures of the base material resulting in changes to hardness of the cylinder and tensile residual stress. It is difficult to accurately inspect landing gear cylinders for thermal damage due to their diameter and depth.

SUMMARY

An inspection system is disclosed herein. The inspection system includes a control system and a hub assembly. The control system includes a base having a top surface and configured to move horizontally forward and backward, an upright member extending orthogonally from the top surface of the base and configured to move vertically up and down, the upright member having a top surface, and an elongated member extending orthogonal to the upright member having a proximal end and a distal end, the proximal end connected to the top of the upright member, wherein the elongated member is configured to rotate. The hub assembly connected to the distal end of the elongated member. The hub assembly includes a spring-loaded arm extending orthogonally from the hub assembly and a sensor connected to a distal end of the spring-loaded arm.

In various embodiments, the inspection system further includes an instrument connected to the sensor, the instrument configured to receive measurements from the sensor.

In various embodiments, the control system further includes a first linear position sensor connected to the base and configured to measure linear movement of the base in a horizontal direction, a second linear position sensor connected to the upright member and configured to measure linear movement in a vertical direction, and a rotation sensor connected to the elongated member and configured to measure rotary motion. In various embodiments, the first linear position sensor is a linear variable differential transformer (LVDT) and the second linear sensor is a LVDT. In various embodiments, the rotation sensor is a rotary variable differential transformer (RVDT).

In various embodiments, the inspection system further includes a cart having a top surface, wherein the control system is disposed on the top surface of the cart.

In various embodiments, the control system further includes a first motor configured to move the base in a horizontal direction, a second motor configured to move the upright member in a vertical direction, and a third motor configured to rotate the elongated member.

In various embodiments, the hub assembly further includes a second spring-loaded arm and a third spring-loaded arm, wherein the second spring-loaded arm is offset from the third spring-loaded arm by about 120° and the third spring-loaded arm is offset from the spring-loaded arm by about 120°.

In various embodiments, the spring-loaded arm further includes an arm portion having a recess formed in an end, a spring disposed in the recess, and a sensor holder connected to the end, the sensor holder being disposed over the spring and the recess. In various embodiments, the sensor is a Barkhausen sensor.

Also disclosed herein is a sensor assembly for inspecting a cylinder bore. The sensor assembly includes a hub having a first portion extending orthogonally from a surface of the hub, wherein the hub is configured to rotate, an arm having a first end and an opposing second end, the first end of the arm connected to the first portion of the hub, and a sensor connected to the second end of the arm, the sensor configured to inspect the cylinder bore.

In various embodiments, the sensor assembly further includes an elongated member having a proximal end and a distal end and configured to move in and out of the cylinder bore, wherein the hub is connected to the distal end of the elongated member.

In various embodiments, the sensor assembly further includes a spring connected to the second end of the arm and configured to apply a force to the sensor to maintain contact with the cylinder bore. In various embodiments, the sensor assembly further includes a recess formed in the second end of the arm and configured to receive the spring, the sensor. In various embodiments, the sensor assembly further includes a sensor holder connected to the second end of the arm and over the spring, the sensor holder configured to move in response to a force applied by the spring.

In various embodiments, the sensor assembly further includes a second portion of the hub, the second portion extending orthogonally from the hub, the second portion being offset from the first portion by about 120° to about 180°, a second arm having a first end and an opposing second end, the first end connected to the second portion, and a second sensor connected to the second end of the second arm. In various embodiments, the sensor assembly further includes a third portion of the hub, the third portion extending orthogonally from the hub, the third portion being offset from the first portion by about 120° and being offset from the second portion by about 120°, a third arm having a first end and an opposing second end, the first end connected to the third portion, and a third sensor connected to the third arm.

Also disclosed herein is an alignment system for inspecting a cylinder bore. The alignment system including a cylinder having the cylinder bore and an opening, an alignment target configured to connect to the cylinder and over the opening, and a sensor assembly. The sensor assembly includes a spring-loaded arm, a sensor connected to an end of the spring-loaded arm, and an optical pointer connected to the spring-loaded arm.

In various embodiments, the alignment system further includes a marking disposed on the alignment target, wherein the optical pointer is configured to align with the marking when the sensor assembly is aligned with the opening. In various embodiments, the sensor assembly is configured to move vertically and horizontally to align the optical pointer with the marking.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
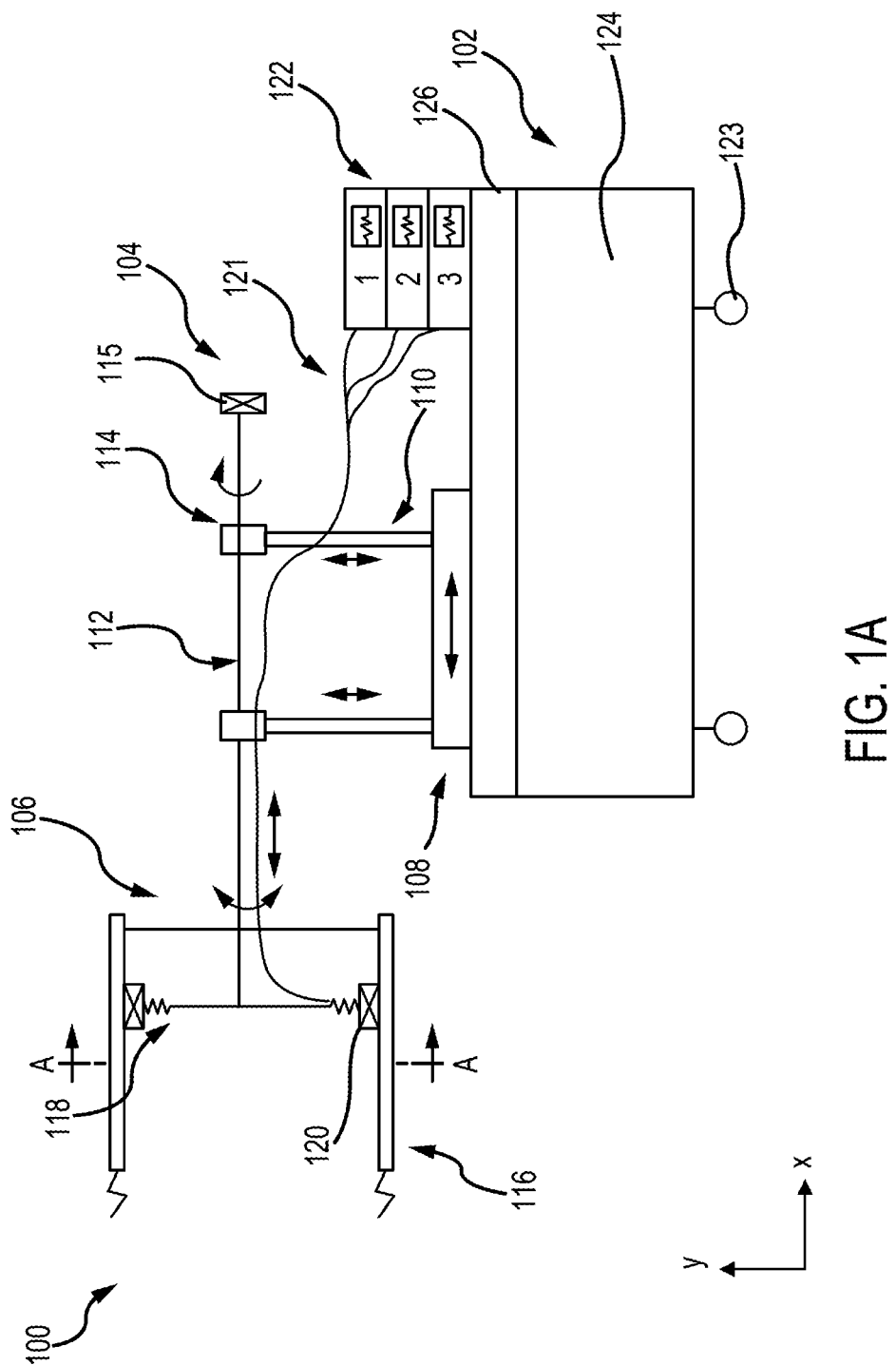
FIGS. 1A and 1B illustrate an inspection system for detecting grinding burns, in accordance with various embodiments.
Figure 1B:
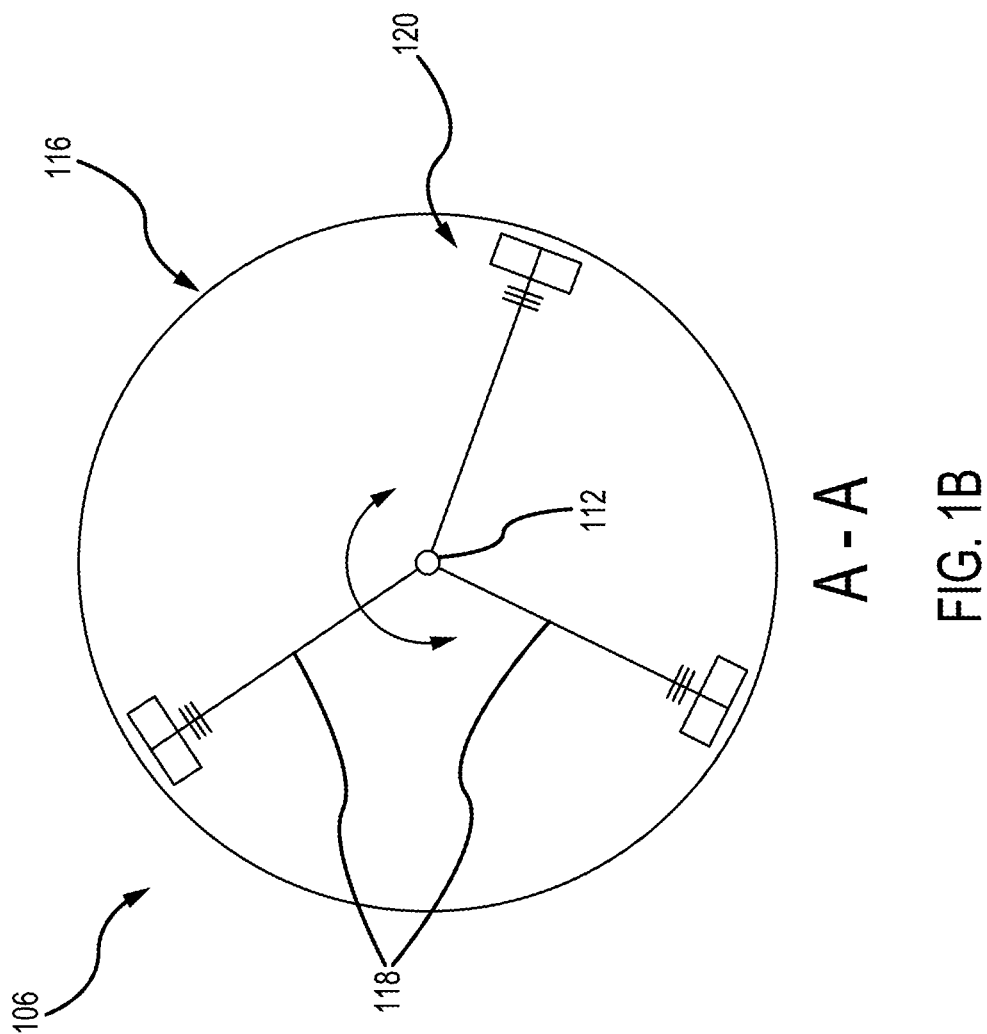

Referring to FIGS. 1A and 1B, in accordance with various embodiments, an inspection system 100 is illustrated. Inspection system 100 includes a cart 102, sensor control system 104, and a sensor assembly 106. FIG. 1B illustrates a cross section view of sensor assembly 106 within a cylinder 116 along line A-A of FIG. 1A. Cart 102 may include wheels 123, a cart body 124, and a top surface 126. Wheels 123 are affixed to the bottom of cart 102 and allow cart 102 to be moved into position near a work piece. In various embodiments, wheels 123 may be caster wheels that may be fixed or swivel and may lock into place. In various embodiments, cart body 124 may be open, having shelves, and may provide support to top surface 126. In various embodiments, cart body 124 may be closed including cabinets and/or drawers for storing tools, materials, power cables, among others. Top surface 126 may be a formed of any suitable material such as a metal, wood, laminate, among others. Top surface 126 supports sensor control system 104 during use of inspection system 100.

Sensor control system 104 includes a base 108, upright supports 110, a boom 112, and boom supports 114. In various embodiments, sensor control system 104 includes a controller for controller movement of sensor control system 104. In various embodiments, instruments 122 may control movement of sensor control system 104. Base 108 is configured to move forward and backward (e.g., the x-direction). In various embodiments, base 108 may be moved by a motor, such as for example, a stepper motor, servo motor, DC motor, or A/C motor, among others. Base 108 includes a linear position sensor to monitor and report the movement of base 108 forward and backward (e.g., the x-direction), such as to the controller. The linear position sensor may be a resistive sensor, inductive sensor, magnetic sensor, pulse encoding, linear potentiometer, or linear variable differential transformer (LVDT), among others.

Upright supports 110 extend orthogonally upward (e.g., the y-direction) from base 108. Illustrated in FIG. 1 are two upright supports 110. In various embodiments, there may be more than two upright supports 110. Upright supports 110 are configured to move up and down (e.g., the y-direction) with respect to base 108. In various embodiments, upright supports 110 may be moved by a motor, such as for example, a stepper motor, servo motor, DC motor, or A/C motor, among others. In various embodiments, each upright support 110 may be coupled to a different motor such that each upright support 110 is able to move independent of the other upright support 110.

Each upright support 110 further includes a boom support 114. Each boom support 114 is connected near the top end of upright support 110. Boom support 114 is configured to support and rotate boom 112. Boom 112 may be an elongated member having a proximal end and a distal end, the proximal end connected to the upright supports 110, such as with boom supports 114. Boom supports 114 further include a motor configured to rotate boom 112 in a clockwise direction and/or a counterclockwise direction. The motor may be a stepper motor, servo motor, DC motor, or A/C motor, among others. In various embodiments, a single motor may be used to rotate boom 112. A rotational position sensor may be connected to boom supports 114 to monitor and report the rotational position of boom 112, such as to the controller, as it is rotated by the motor. The rotational position sensor may be a potentiometer, a hall effect sensor, an inductive sensor, or a rotary variable differential transformer (RVDT), among others.

Sensor assembly 106 is connected to the distal end of boom 112 and is configured to rotate with boom 112. In various embodiments, a counterweight 115 is connected to the proximal end of boom 112 to counterbalance the weight of sensor assembly 106. Sensor assembly 106 includes spring loaded arms 118 and sensors 120. Sensors 120 are each connected to an end of a spring loaded arm 118. Sensor assembly 106 is configured to be inserted into cylinder 116 such that sensors 120 physically contact an inner surface, or inner bore, of cylinder 116. This allows sensors 120 to scan the inner surface of cylinder 116 for defects and/or anomalies. For example, sensors 120 may detect grinding burns caused by previous steps in manufacturing and/or processing of cylinder 116. Sensors 120 may be Barkhausen sensors.

To facilitate the scan of the inner surface multiple spring-loaded arms 118 are used. Each spring loaded arm 118 is offset from the other spring loaded arms 118 by about 100° to about 140°, and more specifically, by about 120°. The offset allows for sensors 120 to overlap during scanning of the inner surface of cylinder 116 while minimizing the number of sensors used to perform the scan. In various embodiments, cylinder 116 may have a diameter of about 10 cm (3.94 inches) to about 61 cm (24 inches) and a depth of about 45 cm (18 inches) to about 244 cm (96 inches). Spring loaded arms 118 of varying lengths may be used to accommodate the different diameters of cylinder 116. Booms 112 of varying lengths may be used to accommodate the different depths of cylinder 116.

Sensors 120 are connected to instruments 122. Instruments 122 may be located on top of surface 126 as illustrated in FIG. 1. In various embodiments, instruments 122 may be located inside cart body 124. Cables 121 connect instruments 122 to sensors 120. There may be one instrument 122 connect to one sensor 120 via one cable 121. In various embodiments, a single cable 121 may connect sensors 120 to instruments 122. In various embodiments, a single instrument 122 may be connected to all sensors 120. During use, cables 121 may twist, thereby limiting rotation of boom 112. To overcome this, boom 112 may rotate a predetermined amount in a clockwise (or counterclockwise) direction and then rotate in a counterclockwise (or clockwise) direction to return to a starting position. In various embodiments, boom 112 may rotate about 100° to about 200°, more specifically, about 120° to about 150°. When spring loaded arms 118 are offset by 120°, rotating 120° provides full coverage of the inner surface of cylinder 116 by sensors 120 when scanning. Rotating more than 120° provides overlap between scans by each sensor 120 thereby providing redundant scanning coverage at each end of the rotation, when spring-loaded arms are offset by 120°.

Instruments 122 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof. Instruments 122 may further comprise memory to store data, executable instructions, system program instructions, and/or controller instructions to implement the control logic of instruments 122.

System program instructions and/or controller instructions of instruments 122 may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se.

A scan begins with sensor assembly 106 positioned inside cylinder 116 and sensors 120 making contact with the inner surface of cylinders 116. This is the starting position. Sensor assembly 106 may be rotated (e.g., clockwise or counterclockwise) 150° while sensors 120 scan the inner surface of cylinder 116. This is accomplished by rotating boom 112 and monitoring the rotation of boom 112 using the rotational position sensor. Sensors 120 scan the inner surface of cylinder 116 throughout the entire rotation of sensor assembly 106. Spring loaded arms 118 press sensors 120 against the inner surface of cylinder 116 to provide good contact for scanning. When the 150° rotation is completed, sensor assembly 106 is rotated (e.g., clockwise or counterclockwise) back to the starting position. 150° back to the starting position.

Figure 3:
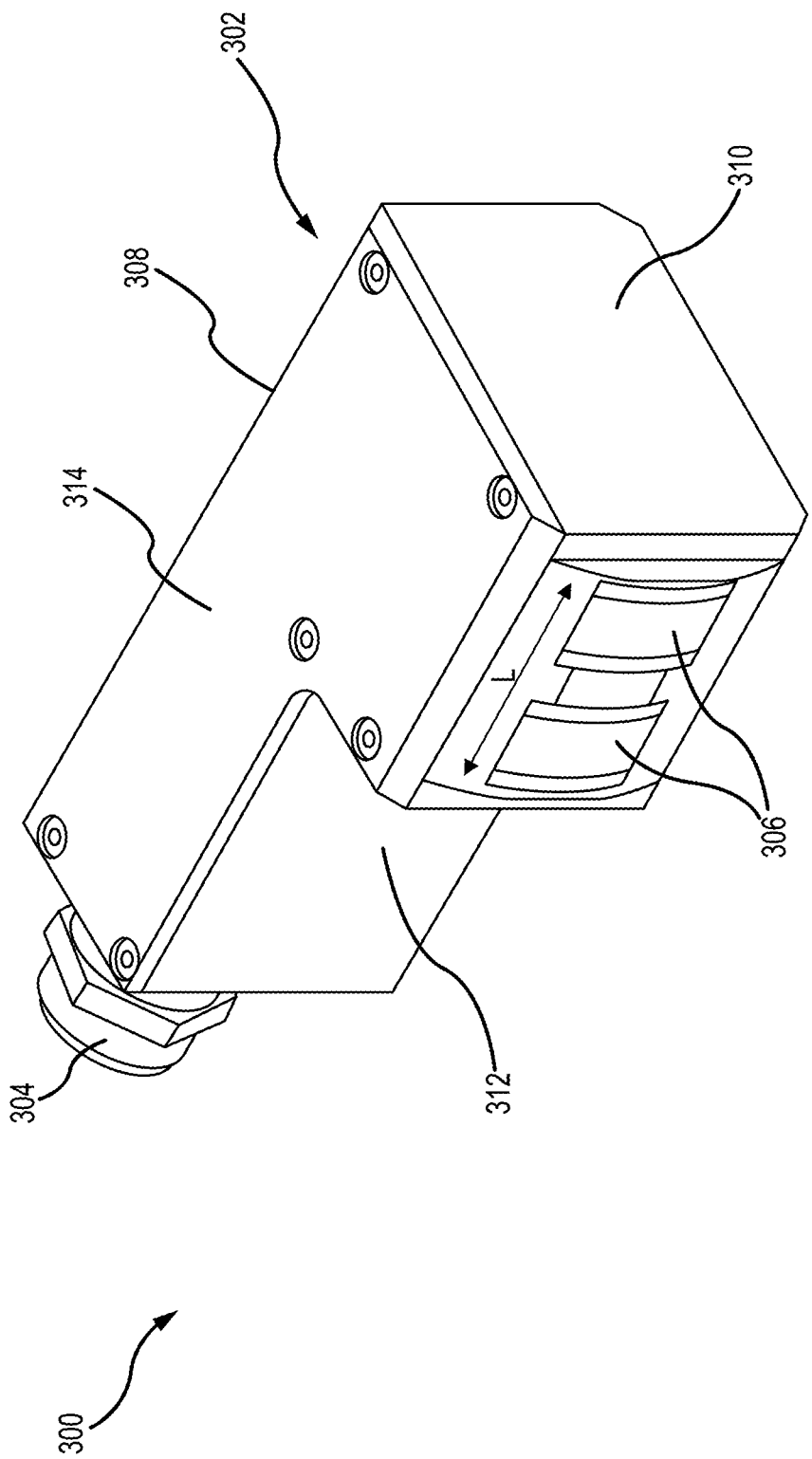
FIG. 3 illustrates an alignment system for the inspection system, in accordance with various embodiments.

The base 108 then moves forward (e.g., the negative x direction) advancing the sensor assembly 106 further into cylinder 116. Base 108 may be advanced one full unit of measure, where one full unit of measure is equal to the length of the sensor surface of sensor 120. Sensor length L, described below with respect to FIG. 3, is an example of a full unit of measure. In various embodiments, base 108 may be advanced a fraction of one full unit of measure. For example, base 108 may be advanced between about 25% and about 100%, more specifically, between about 50% and about 75% of one full unit of measure. In various embodiments, boom 112 may be advanced forward (e.g., in the x-direction) by base 108 moving forward. In various embodiments, boom 112 may be advanced forward (e.g., in the x-direction) by cart 102 moving forward. The distance moved forward for each scanning pass may depend on a determined amount of overlap of each cycle. More overlap may provide a more precise scan. Less overlap may result in the scan completing faster.

The sensor assembly 106 is then rotated, as described above, to perform another scanning pass. This process continues until the entire inner surface of cylinder 116 is scanned. Instruments 122 record the data from each scanning pass. In various embodiments, a controller may control the scanning process, thereby automating the process. In various embodiments, the controller may be housed in instruments 122.

Figure 2B:
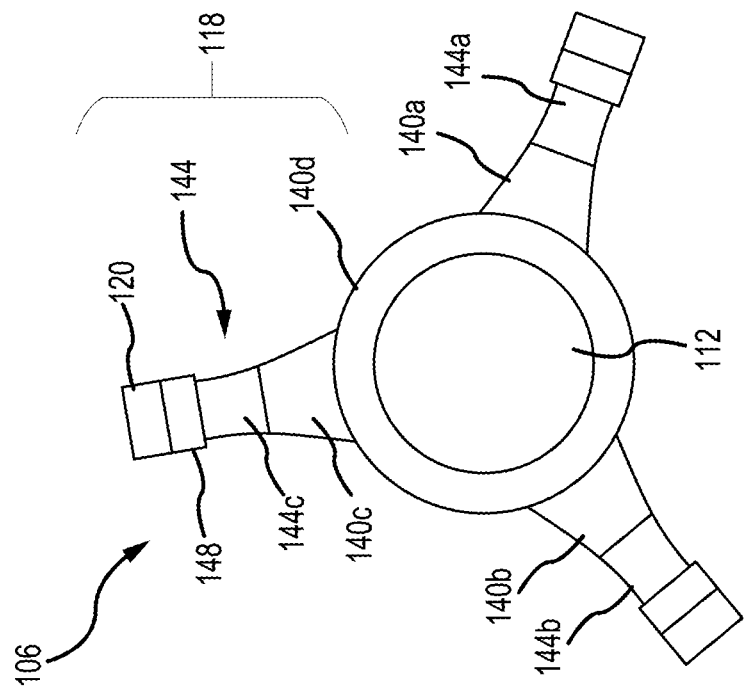
FIGS. 2A and 2B illustrate a sensor assembly for detecting grinding burns, in accordance with various embodiments.
Figure 2A:
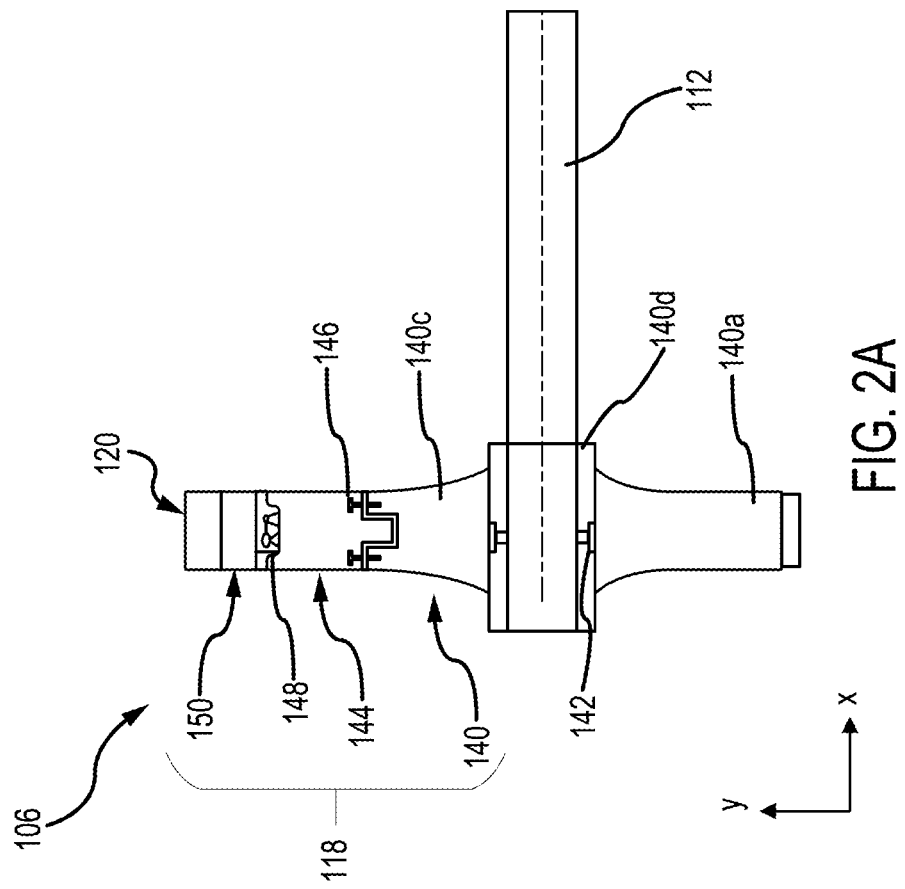

Referring now to FIGS. 2A and 2B, in accordance with various embodiments, illustrated are side and front views, respectively, of sensor assembly 106. Sensor assembly 106, more specifically, spring-loaded arms 118 includes a hub 140, arms 144, a spring 148, and a sensor holder 150. Hub 140 is connected to, and circumferentially around, boom 112 and is configured to rotate with boom 112. Hub 140 may be connected to boom 112 using connectors 142. In various embodiments, hub 140 may be integral to boom 112. In various embodiments, hub 140 may be press fit to boom 112 or connected to boom 112 by welding, adhesive, or epoxy, among others.

As illustrated, hub 140 includes a hub body 140d, a first portion 140a, a second portion 140b, and a third portion 140c. Hub body 140d has an annular shape and is positioned around boom 112 so that it rotates with boom 112. First portion 140a extends orthogonally outward from hub body 140d and boom 112. Second portion 140b extends orthogonally outward from hub body 140d and boom 112 and is offset 120° from first portion 140a. Third portion 140c extends orthogonally outward from hub body 140d and boom 112 and is offset 120° from first portion 140a and second portion 140b. In various embodiments, hub body 140d, first portion 140a, second portion 140b, and third portion 140c may be integral, forming a single body. In various embodiments, hub body 140d, first portion 140a, second portion 140b, and third portion 140c may be separate and distinct members that are connected to form hub 140.

Arms 144a, 144b, 144c (collectively arms 144) have a first end connected to hub 140 and a second end extending away from hub 140. For example, arm 144a is connected to first portion 140a, arm 144b is connected to second portion 140b, and arm 144c is connected to third portion 140c. Each arm 144a, 144b, 144c may be connected to each respective hub portion 140a, 140b, 140c using connectors 146. In various embodiments, arms 144 may connect to hub portions 140a, 140b, 140c using other means such as being press fit, push button, latch, or be slidably connected, among others. Arms 144 may vary in length where the length of each arm 144 may be about 3 cm (1.18 inches) to about 61 cm (24 inches) or longer, more specifically, the length of each arm 144 may be about 10 cm (3.93 inches) to about 40.64 cm (16 inches). The term "about" in this context means+/−5% of the given value. Varying the length of arm 144 allows sensor assembly 106 to fit inside cylinders 116 of different sizes so that a single inspection system 100 may be used to inspect different cylinders 116. The difference in arm length is due to the difference in diameter of cylinder 116, as described above. In various embodiments, arms 144a, 144b, 144c may be integral to hub 140. In various embodiments, there may be more or fewer arms 144 than those illustrated and described herein.

The second end of each of arms 144a, 144b, 144c is configured to hold spring 148. In various embodiments, there may be a recess in the second end of each arm 144 configured to receive and secure spring 148. In various embodiments, spring 148 may extend from the second end of each arm 144 instead of being seated in a recess. Spring 148 may be a disk spring or a wave spring, among others.

Sensor holder 150 is attached to the second end of arm 144, and over spring 148, and is configured to hold sensor 120 allowing sensor 120 to rotate with hub 140 and boom 112. Sensor holder 150 may include connectors, supports, clips, latches, and/or fasteners, among others, that are configured to support and secure sensor 120. Sensor holder 150 may move up and down (e.g., the y-direction) in response to the pressure from spring 148 on a first end or from sensor 120 on a second end of sensor holder.

Referring now to FIG. 3, in accordance with various embodiments, an Barkhusen sensor 300 is illustrated. Sensor 300 may an example of sensor 120 described above. Sensor 300 includes a housing 302, a cable connector 304, and sensor elements 306. Housing 302 includes a back surface 308, a top surface 310, a front surface 312, and side surfaces 314. Cable connector 304 provides a connection (e.g., cables 121) for sending measurements from sensor 206 to a processor (e.g., instruments 122) for collection and analysis. Sensor elements 306 have a surface length L that is equal to the surface length of sensor elements 306. Surface length L may be equal to the one full unit of measure described above with respect to FIG. 1.

Figure 4:
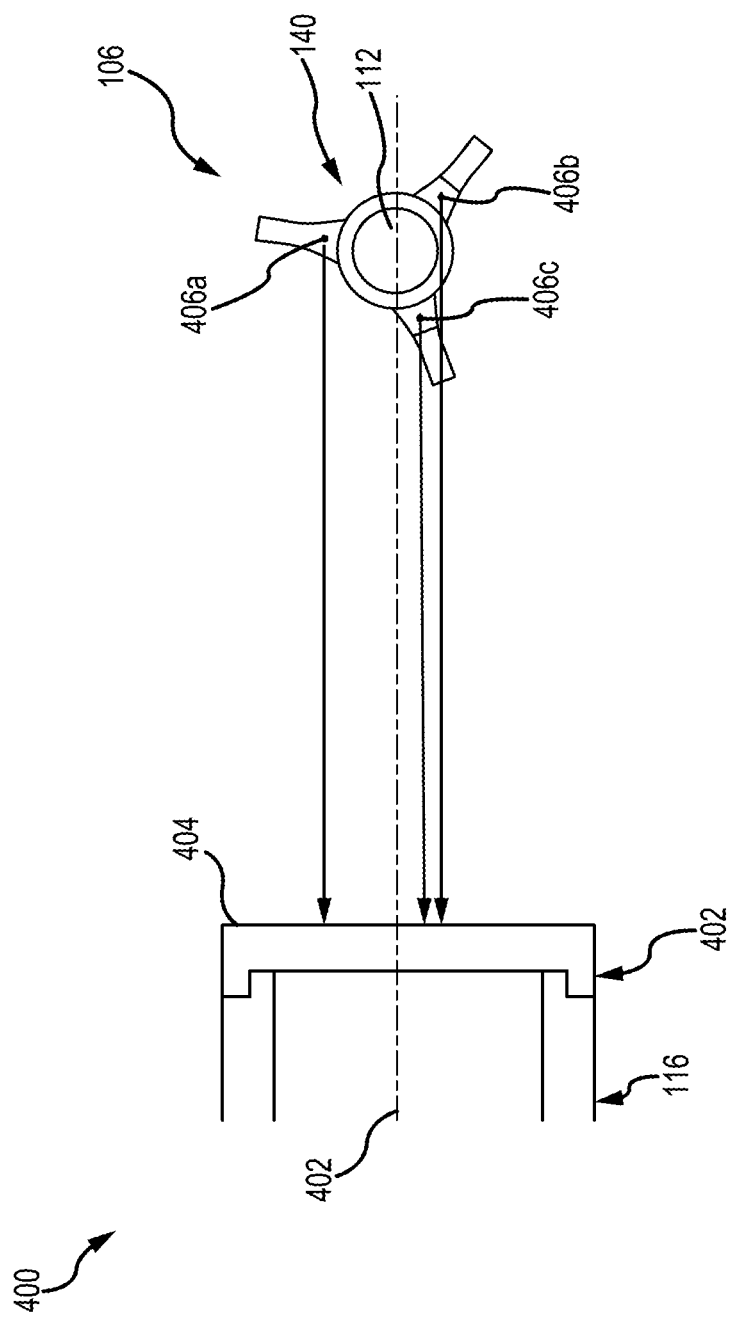
FIG. 4 illustrates a sensor used with the inspection system, in accordance with various embodiments.

Returning to FIGS. 2A and 2B, sensor holder 150 may be configured to hold sensor 300, as an example, with back surface 308 positioned against sensor holder 150 and front surface 310 and sensor elements 306 facing away from sensor holder 150. In this configuration, the surface of sensor elements 306 is able to physically contact the inner surface of cylinder 116. Spring 148 applies a force to sensor holder 150 so that sensor 120 (e.g., sensor 300) maintains physical contact the inner surface of cylinder 116 while rotating within cylinder 116. Imperfections on the inner surface of cylinder 116 may press Referring now to FIG. 4, in accordance with various embodiments, an alignment system 400 is illustrated. Alignment system 400 may be used with inspection system 100 to align sensor assembly 106 with a center axis 402 of cylinder 116. Alignment system 400 includes an alignment target 404 and optical pointers 406a, 406b, 406c (collectively optical pointers 406). In various embodiments, optical pointers 406 may be laser pointers. Alignment target 404 is placed over an opening of cylinder 116, as illustrated. Alignment target 404 may include a marking that aligns with each optical pointer 406a, 406b, 406c to signify that a proper alignment is achieved. In various embodiments, the marking may be a circle, a triangle, or a dot, among others. When using a dot, or other such marking, the position of hub 140 correlates with a specific starting position as well as an alignment with center axis 402 of cylinder 116. When using another marking (e.g., a circle), hub 140 is aligned with center axis 402 but may not be in a specific starting position.

During alignment, sensor assembly 106 is pointed toward alignment target 404 and optical pointers 406 are turned on. Sensor assembly 106 may then be moved up and/or down, back and/or forth, and/or side to side to align optical pointers 406 with the markings on alignment target 404. After properly aligning sensor assembly 106, the alignment target 404 is removed and sensor assembly 106 may be introduced into the cylinder 116. Alignment system 400 provides an easy to use alignment procedure for accurately setting up inspection system 100 and accurately scanning the inner surface of cylinder 116.

Benefits, other advantages, and solutions to problems have been described herein with regard to specific embodiments. Furthermore, the connecting lines shown in the various figures contained herein are intended to represent functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An inspection system for inspecting a cylinder bore, comprising:
   a control system, including:
      a base having a top surface and configured to move horizontally forward and backward;
      an upright member extending orthogonally from the top surface of the base and configured to move vertically up and down, the upright member having a top surface;
      an elongated member extending orthogonal to the upright member having a proximal end and a distal end, the proximal end connected to the top of the upright member, wherein the elongated member is configured to rotate;
      a rotation sensor connected to the elongated member and configured to measure rotary motion of the elongated member; and
      a sensor assembly connected to the distal end of the elongated member, the sensor assembly including:
         a hub having a hub body and a first portion extending orthogonally from a surface of the hub body, wherein the hub is configured to rotate;
         a first arm having a first end and an opposing second end, the first end of the first arm removably coupled to the first portion and the second end of the first arm extending away from the hub body;
         a spring, wherein the second end of the first arm comprises a recess and wherein the recess is configured to receive and secure the spring;
         a sensor holder, the sensor holder coupled to the second end of the first arm over the spring and the recess; and
         a sensor, the sensor configured to inspect the cylinder bore, wherein the sensor holder is configured to hold the sensor and wherein the sensor holder is configured to move up and down in response to pressure from the spring on a first end of the sensor holder or from the sensor on a second end of the sensor holder.

2. The inspection system of claim 1, further comprising: an instrument connected to the sensor, the instrument configured to receive measurements from the sensor.

3. The inspection system of claim 1, the control system further comprising:
   a first linear position sensor connected to the base and configured to measure linear movement of the base in a horizontal direction; and
   a second linear position sensor connected to the upright member and configured to measure linear movement in a vertical direction.

4. The inspection system of claim 3, wherein the first linear position sensor is a linear variable differential transformer (LVDT) and the second linear sensor is a LVDT.

5. The inspection system of claim 1, wherein the rotation sensor is a rotary variable differential transformer (RVDT).

6. The inspection system of claim 1, further comprising: a cart having a top surface, wherein the control system is disposed on the top surface of the cart.

7. The inspection system of claim 1, the control system further comprising:
   a first motor configured to move the base in a horizontal direction;
   a second motor configured to move the upright member in a vertical direction; and
   a third motor configured to rotate the elongated member.

8. The inspection system of claim 1, the hub assembly further comprising:
   a second arm; and
   a third arm, wherein the second arm is offset from the third arm by about 120° and the third arm is offset from the first arm by about 120°.

9. The inspection system of claim 1, wherein the sensor is a Barkhausen sensor.

10. The inspection system of claim 1, further comprising: a counterweight coupled to the proximal end of the elongated member to counterbalance a weight of sensor assembly.

11. A sensor assembly for inspecting a cylinder bore, comprising:
    a hub having a hub body and a first portion extending orthogonally from a surface of the hub body, wherein the hub is configured to rotate;
    a first arm having a first end and an opposing second end, the first end of the first arm removably connected to the first portion and the second end of the first arm extending away from the hub body;
    a first spring, wherein the second end of the first arm comprises a first recess and wherein the first recess is configured to receive and secure the first spring;
    a first sensor holder, the first sensor holder coupled to the second end of the first arm over the first spring and the first recess;
    a first sensor, the first sensor configured to inspect the cylinder bore, wherein the first sensor holder is configured to hold the first sensor and wherein the first sensor holder is configured to move up and down in response to pressure from the first spring on a first end of the first sensor holder or from the first sensor on a second end of the first sensor holder;

an elongated member having a proximal end and a distal end and configured to move in and out of the cylinder bore, wherein the hub body is connected to the distal end of the elongated member; and a rotation sensor connected to the elongated member and configured to measure rotary motion of the elongated member.

12. The sensor assembly of claim 11, wherein the spring is configured to apply a force to the sensor to maintain contact with the cylinder bore.

13. The sensor assembly of claim 11, further comprising:
a second portion of the hub body, the second portion extending orthogonally from the hub body, the second portion being offset from the first portion by about 120° to about 180°;
a second arm having a first end and an opposing second end, the first end of the second arm connected to the second portion and the second end of the second arm extending away from the hub body;
a second spring, wherein the second end of the second arm comprises a second recess and wherein the second recess is configured to receive and secure the second spring;
a second sensor holder, the second sensor holder coupled to the second end of the second arm over the second spring and the second recess; and
a second sensor, wherein the second sensor holder is configured to hold the second sensor and wherein the second sensor holder is configured to move up and down in response to pressure from the second spring on a first end of the second sensor holder or from the second sensor on a second end of the second sensor holder.

14. The sensor assembly of claim 13, further comprising:
a third portion of the hub body, the third portion extending orthogonally from the hub body, the third portion being offset from the first portion by about 120° and being offset from the second portion by about 120°;
a third arm having a first end and an opposing second end, the first end of the third arm connected to the third portion and the second end of the third arm extending away from the hub body;
a third spring, wherein the second end of the third arm comprises a third recess and wherein the third recess is configured to receive and secure the third spring;

a third sensor holder, the third sensor holder coupled to the second end of the third arm over the third spring and the third recess; and
a third sensor, wherein the third sensor holder is configured to hold the third sensor and wherein the third sensor holder is configured to move up and down in response to pressure from the third spring on a first end of the third sensor holder or from the third sensor on a second end of the third sensor holder.

15. An alignment system for inspecting a cylinder bore, comprising:
a cylinder having the cylinder bore and an opening;
an alignment target configured to connect to the cylinder and over the opening;
a sensor assembly, including:
a hub having a hub body and a first portion extending orthogonally from a surface of the hub body, wherein the hub is configured to rotate;
a first arm having a first end and an opposing second end, the first end of the first arm removably connected to the first portion and the second end of the first arm extending away from the hub body;
a first spring, wherein the second end of the first arm comprises a first recess and wherein the first recess is configured to receive and secure the first spring;
a first sensor holder, the first sensor holder coupled to the second end of the first arm over the first spring and the first recess; and
a first sensor, the first sensor configured to inspect the cylinder bore, wherein the first sensor holder is configured to hold the first sensor and wherein the first sensor holder is configured to move up and down in response to pressure from the first spring on a first end of the first sensor holder or from the first sensor on a second end of the first sensor holder;
an elongated member having a proximal end and a distal end and configured to move in and out of the cylinder bore, wherein the hub body is connected to the distal end of the elongated member; and
a rotation sensor connected to the elongated member and configured to measure rotary motion of the elongated member.

16. The alignment system of claim 15, further comprising:
a marking disposed on the alignment target, wherein the optical pointer is configured to align with the marking when the sensor assembly is aligned with the opening.

17. The alignment system of claim 16, wherein the sensor assembly is configured to move vertically and horizontally to align the optical pointer with the marking.

* * * * *